(12) United States Patent
Dolce et al.

(10) Patent No.: US 9,740,435 B2
(45) Date of Patent: Aug. 22, 2017

(54) METHODS FOR MANAGING CONTENT STORED IN CLOUD-BASED STORAGES

(75) Inventors: James J. Dolce, Rochester, NY (US); Jeffery R. Bloom, Rochester, NY (US)

(73) Assignee: FUJIFILM NORTH AMERICA CORPORATION, Valhalla, NY (US)

( * ) Notice: Subject to any disclaimer, the term of this patent is extended or adjusted under 35 U.S.C. 154(b) by 1044 days.

(21) Appl. No.: 13/406,085

(22) Filed: Feb. 27, 2012

(65) Prior Publication Data

US 2013/0227047 A1 Aug. 29, 2013

(51) Int. Cl.
*G06F 3/06* (2006.01)
*G06F 17/30* (2006.01)

(52) U.S. Cl.
CPC ............ *G06F 3/067* (2013.01); *G06F 3/0605* (2013.01); *G06F 3/0643* (2013.01); *G06F 17/30203* (2013.01); *G06F 17/30235* (2013.01)

(58) Field of Classification Search
CPC ................ H04L 29/08072; H04L 29/06; H04L 29/08549
USPC ........................................................ 709/213
See application file for complete search history.

(56) References Cited

U.S. PATENT DOCUMENTS

| 6,269,382 | B1 * | 7/2001 | Cabrera | ............ G06F 17/30082 |
| 8,316,125 | B2 * | 11/2012 | DeHaan | ........................ 709/224 |
| 2005/0283649 | A1 * | 12/2005 | Turner | ................ H04L 67/1095 714/6.12 |
| 2006/0271758 | A1 * | 11/2006 | Innan et al. | ................... 711/170 |
| 2007/0083575 | A1 * | 4/2007 | Leung | ............... G06F 17/30082 |
| 2008/0184125 | A1 * | 7/2008 | Suleiman | .................. G06F 3/06 715/734 |
| 2008/0270933 | A1 * | 10/2008 | Straw | .................... G06F 3/0481 715/781 |
| 2009/0172217 | A1 * | 7/2009 | Nochimowski | ....... G06F 3/0607 710/38 |
| 2010/0332454 | A1 * | 12/2010 | Prahlad | ............... G06F 17/3002 707/654 |
| 2011/0022642 | A1 * | 1/2011 | deMilo et al. | ................ 707/805 |
| 2012/0158821 | A1 * | 6/2012 | Barros | ............. G06F 17/30563 709/203 |
| 2012/0323977 | A1 * | 12/2012 | Fortier | ................ G06F 17/3007 707/812 |
| 2013/0041728 | A1 * | 2/2013 | Morrow | ................. G06Q 30/00 705/14.4 |
| 2013/0204849 | A1 * | 8/2013 | Chacko | ........................ 707/692 |
| 2014/0280966 | A1 * | 9/2014 | Sapuram | ............ G06Q 30/0631 709/226 |
| 2015/0178007 | A1 * | 6/2015 | Moisa | ................... G06F 3/0622 713/190 |

* cited by examiner

*Primary Examiner* — Nicholas Taylor
*Assistant Examiner* — Chong G Kim
(74) *Attorney, Agent, or Firm* — Blakely, Sokoloff, Taylor & Zafman LLP

(57) ABSTRACT

A server receives over a network from a client a request for accessing files stored in a plurality of heterogeneous storage devices hosted by a plurality of storage providers over the network, including a first storage device of a first storage provider and a second storage device of a second storage provider. In response, the server accesses, on behalf of a user of the client, the first storage device and the second storage device to retrieve information concerning the files. The server transmits data to the client over the network, the data representing a logical file system view of the files without exposing actual storage locations of the files stored in the first and second storage devices.

22 Claims, 9 Drawing Sheets

| Storage Provider ID | Credentials (e.g., username/password) | Status (e.g., available space/bandwidth) | Statistics (e.g., access time/performance) |
|---|---|---|---|
| Amazon | | | |
| iCloud | | | |
| ⋮ 301 | ⋮ 302 | ⋮ 303 | ⋮ 304 |
| Facebook | ⋮ | ⋮ | ⋮ |

METHODS FOR MANAGING CONTENT STORED IN CLOUD-BASED STORAGES

FIELD OF THE INVENTION

Embodiments of the present invention relate generally to managing content stored in storages. More particularly, embodiments of the invention relate to managing content stored in cloud-based storages.

BACKGROUND

Today there are numerous services available which provide free storage space to users who are willing to sign up and create an account with them. These storage providers enable users to place any types of files into storage "in the cloud" and off their local devices' hard drives. Generally these services provide a user with the ability to gain more storage either by making a purchase or by recruiting new members to their services. In other cases the types of storage available is more specific. For example, consumers can store photos for free on a variety of photo-specialty sites. In some situations the consumers files can remain in these specific storage sites for free provided the end user makes a purchase such as ordering prints.

The storage providers generally provide application programming interfaces (APIs) which enable third party applications to authenticate a user (login) and then access the user's files and storage. A user may have multiple user accounts provided by multiple storage providers and the user has to specifically manage these accounts individually. For example, a user has to remember the credentials such as usernames and passwords for accessing these accounts and has to be aware of the available storage space from these accounts. There has been a lack of efficient mechanisms for managing these accounts for the users.

BRIEF DESCRIPTION OF THE DRAWINGS

Embodiments of the invention are illustrated by way of example and not limitation in the figures of the accompanying drawings in which like references indicate similar elements.

FIG. 3 is a diagram illustrating a data structure for storing storage information according to one embodiment of the invention.

DETAILED DESCRIPTION

Figure 1:
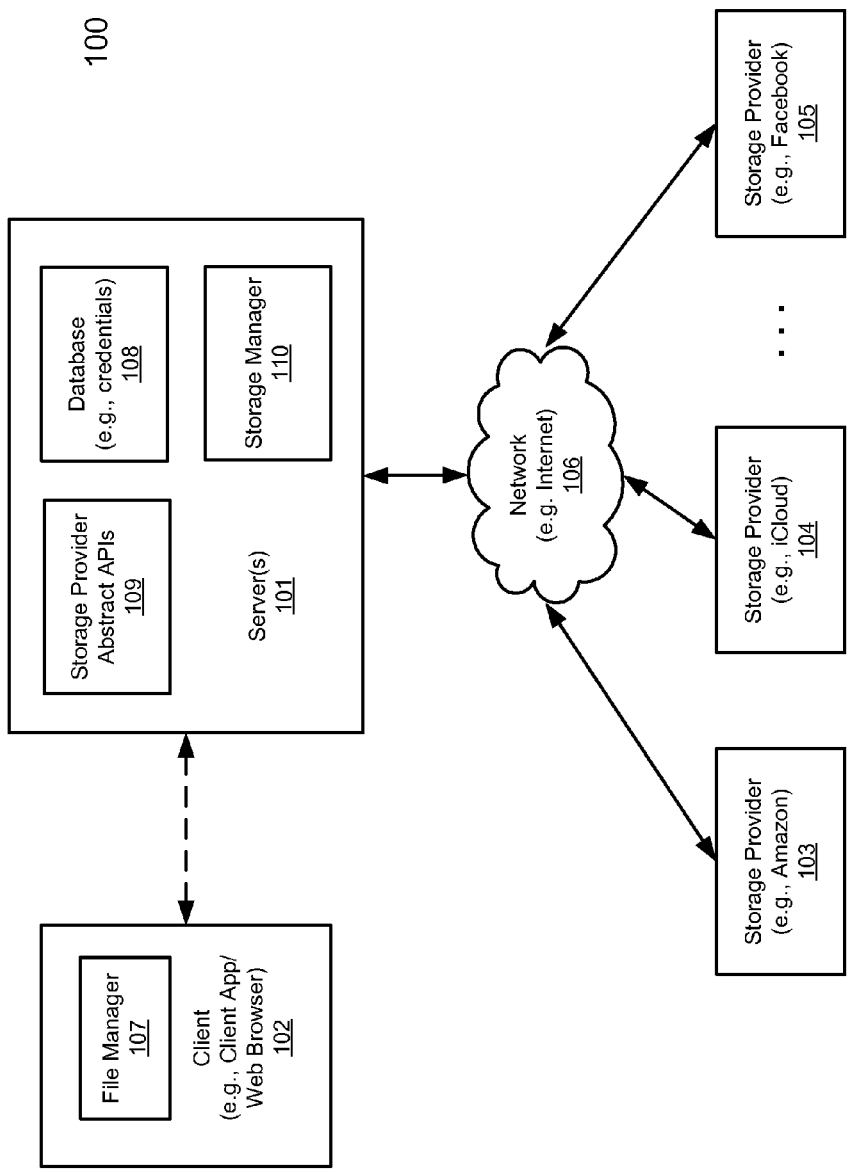
FIG. 1 is a block diagram illustrating a system for managing cloud-based storage according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a storage management platform such as a Web server or an application server is utilized to allow a user to centrally manage multiple user accounts provided by multiple storage providers over a network. The organization hosting the storage management platform may be the same or a different entity from the storage providers. The storage management platform may be accessed from a variety of client devices using a variety of communications protocols over a network such as the Internet. In one embodiment, the storage management system is to maintain credentials on behalf of users, such as usernames and passwords of user accounts of storage providers that are associated with the users. The storage management system serves as a central access point for the users to access the user accounts of the storage providers. When a user wishes to access any one of the user accounts of the storage providers, the user can do so via the storage management system without having to provide the necessary credentials again at the point in time.

According to one embodiment, the storage management system presents a unified logical file system view at a user device (e.g., desktop, dashboard, etc.) The unified logical file system view is used to logically present content or files stored amongst the storage providers without showing actual physical locations of the files. The storage management system maintains a mapping mechanism to map logical files to physical files stored in storage servers of the storage providers. The storage management system further manages or monitors the storage resources of the storage providers that are associated with each user, including the available storage space, performance (e.g., bandwidth) of the storage providers, and user access patterns, etc. Certain files may be relocated or migrated from one storage provider to another storage provider based on a variety of considerations such as available storage space, bandwidth, and user access patterns, etc. When additional storage is needed, the storage management system may coordinate the user's access to one or more storage providers to acquire additional storage space, while maintaining the same or a similar logical file system view. As a result, a user does not have to know where the files are located and/or to decide where to store additional files, etc.

FIG. 1 is a block diagram illustrating a system for managing cloud-based storage according to one embodiment of the invention. Referring to FIG. 1, system 100 includes a storage management sever 101 to manage, on behalf of a variety of clients or users, user accounts from storage providers 103-105 over a network 106. In this example, storage providers 103-105 provide storage space (e.g., free or paid storage space) for client 102 over a network. Although only one client 102 is shown for the purpose of illustration only; many clients may also be communicatively coupled to server 101 over a network. Similarly, although one management server is shown, multiple servers can be implemented, for example, in a distributed manner. Each client or user may open one or more user accounts in storages of storage providers 103-105. Each client or user may also maintain an account in storage management server 101 to store information about the user accounts from storage providers 103-105. A client device may be a variety of devices, such as a desktop, laptop, tablet, mobile phone, personal digital assistant (PDA), media player, gaming device, etc.

In this example, client 102 is communicatively coupled to server 101 over a network, which may be the same or a different network as network 106. A network described throughout this application may be a local area network (LAN), a wide area network (WAN) such as the Internet, or a combination thereof, wired or wireless. The user of client 102 can store a variety of files in storage providers 103-105 such as music files, movie files, documents, etc. It is assumed that a user associated with client 102 has at least one user account in each of storage providers 103-105.

Typically, in order to access the content stored in storage providers 103-105, a user has to individually log in to each of storage providers 103-105 using the necessary credentials (e.g., usernames and passwords) associated with each of storage providers 103-105. As a result, the user has to remember the credentials for each of storage providers 103-105. In addition, the user has to know what files are currently stored in which of storage providers 103-105, which may be tedious under certain circumstances.

According to one embodiment, for each user registered with storage management system 100, a user account is created and maintained within database 108 by server 101. Database 108 may includes credentials for accessing any one of storage providers 103-105. When a user of client 101 wishes to access any one of storage providers 103-105, file manager 107 of client 101 can connect and log in with server 101. In response, storage manager 110 is configured to retrieve the necessary credentials from database 108 and access the associated storage providers 103-105 via storage provider application programming interfaces (APIs) 109 over network 106. In one embodiment, sever 101 accesses storage providers 103-105 on behalf of client 101 using the associated credentials without having to prompt the user of client 101 for the same at the point in time. Storage manager 110 is configured to store and retrieve files to and from storage providers 103-105 in response to user commands received from client 102.

Figure 2:
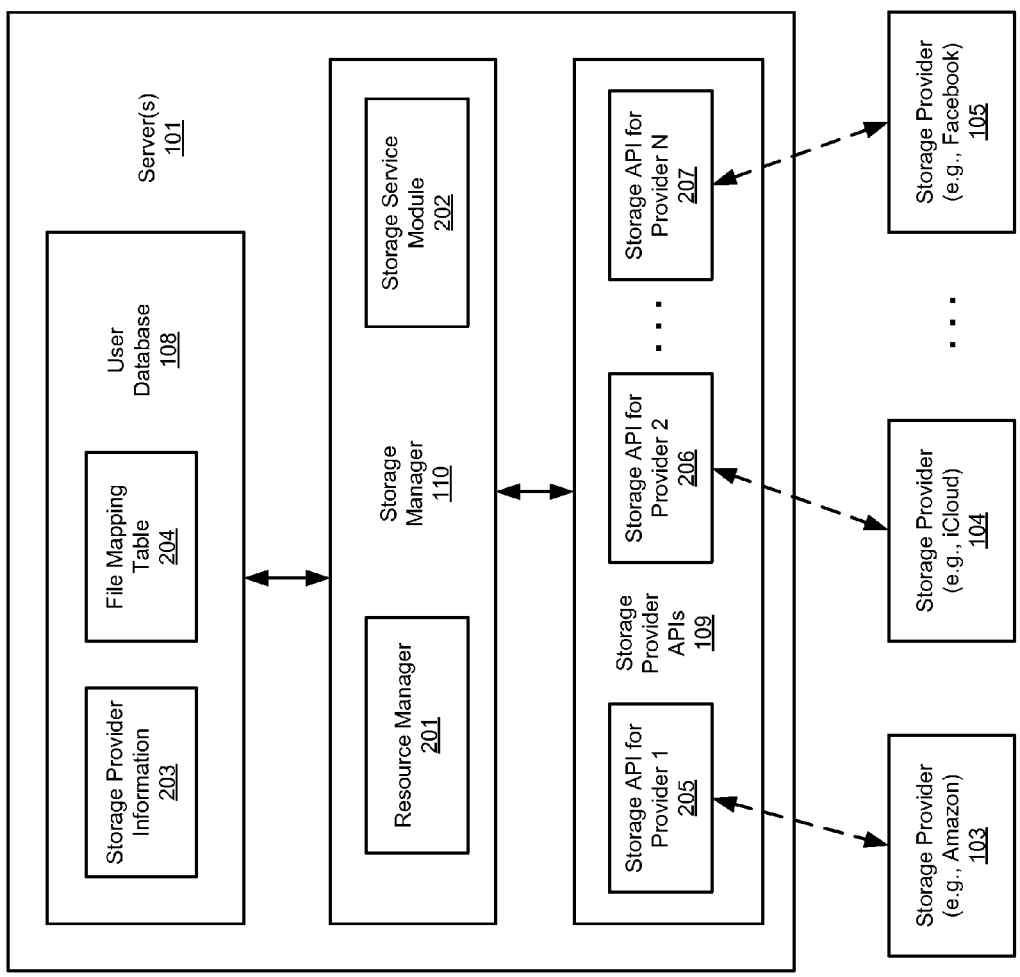
FIG. 2 is a block diagram illustrating a storage management system according to another embodiment of the invention.

FIG. 2 is a block diagram illustrating a storage management system according to another embodiment of the invention. Referring to FIG. 2, server 101 includes, but is not limited to, storage manager 110 to access storage providers 103-105 via storage provider APIs 109 on behalf of clients using information maintained in database 108. Storage manager 110 includes resource manager 201 and storage service module 202. Storage service module 202 is configured to provide services to requests for storing and/or retrieving files to and from storage providers 103-105 via storage provider APIs 205-207, respectively.

According to one embodiment, in response to a request from a client to access any one of storage providers 103-105, storage service module 202 is configured to access user database 108 associated with a user of the client to obtain storage information 203 of the user. An example of storage information 203 is shown in data structure 300 of FIG. 3. Referring to FIGS. 2 and 3, for each storage providers identified in field 301, the associated credentials can be retrieved from field 302 and utilized to access the corresponding storage provider(s) on behalf of the user without having to prompt the user for the same credentials at that point in time. The storage information may be collected and stored in data structure 300 when the user registered with management server 101. The user may modify or update the credentials or some other user information at any time via an API, —Web, or client interface. Such an interface would enable the user to update usernames and passwords for previously entered credentials, as well as identifying/adding credentials for new storage accounts which they have created.

According to one embodiment, storage service module 202 is configured to present to a client such as client 101 a unified logical file system view of files stored in storage providers 103-105. File mapping table 204 is maintained to map the logical file objects (e.g., logical file namespace) with the physical file objects (e.g., physical storage locations such as universal resource indicators (URIs)) stored in storage providers 103-105. The unified logical file system view may be presented to the client as a Web page to be presented via a browser application. Alternatively, the unified file system view may be presented via a client application running within the client (e.g., thin client application, dashboard) and/or file manager 107. The files stored in storage providers 103-105 may be presented in a view similar to a view presented by an ordinary network file system (NFS) without showing the actual physical storage locations of storage providers 103-105, as shown in FIG. 4A.

Figure 4A:
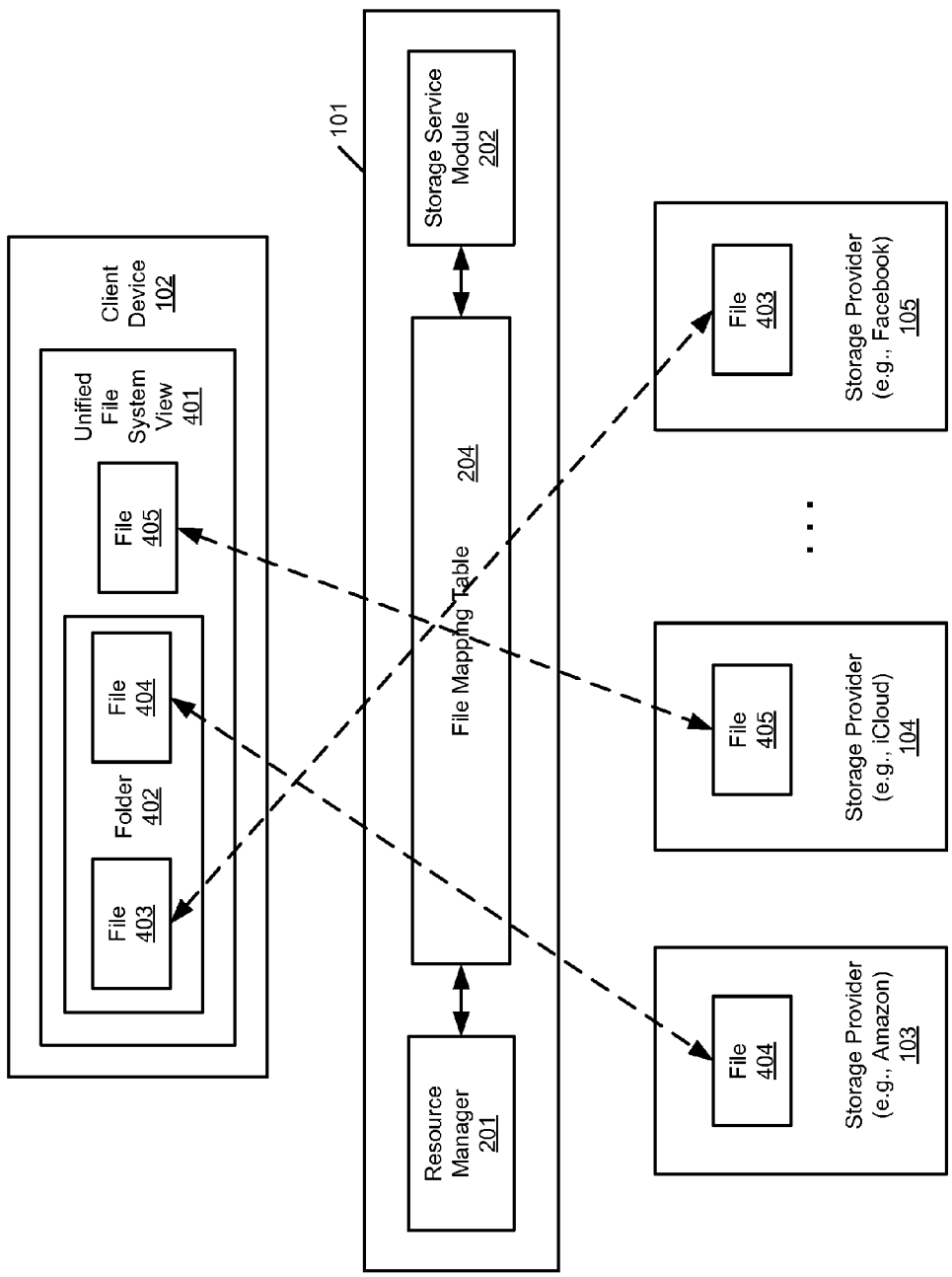
FIGS. 4A and 4B are block diagrams illustrating a storage management system according to certain embodiments of the invention.

Referring to FIG. 4A, in this example, unified file system view 401 presented at client 102 includes folder 302 having files 403-404, and file 405. The unified file system view 401 does not show where the files 403-405 are actually stored in which of storage providers 103-105. Rather, file mapping table 204 is maintained by storage manager 110 to map the logical files presented in unified file system view 401 and the physical files stored in storage providers 103-105. As a result, a user does not need to know where the files are actually stored amongst storage providers 103-105. In other embodiments, the file mapping table 204 may be maintained by file manager 107 at the client 102. According to one embodiment, a user of client device 102 does not require someone to specifically ask to store a file. The client could present options whereby all files are stored in the cloud and presented locally as a logical file system view. In this case, any time a user does something like a "save as" in a tool which would generate a new copy of a file on a local drive, the tool could automatically store that file up in the cloud. The user would only see the file as a logical local file.

Figure 5:
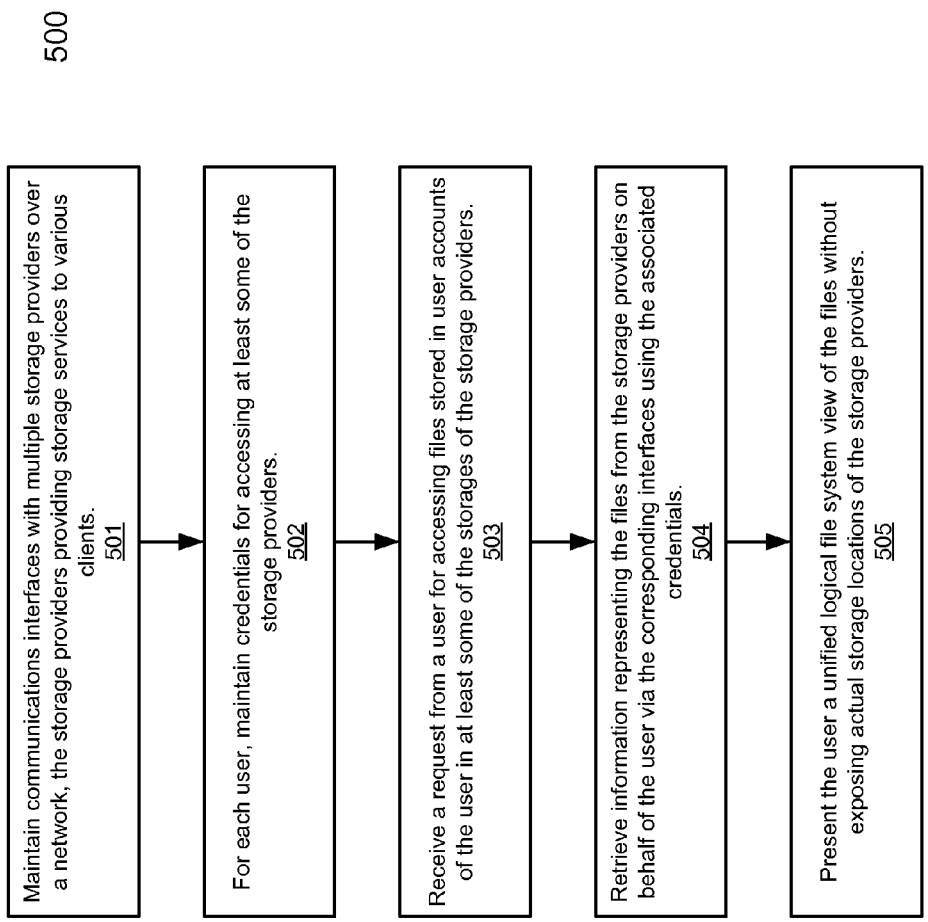
FIG. 5 is a flow diagram illustrating a method for managing cloud-based storage according to one embodiment of the invention.

FIG. 5 is a flow diagram illustrating a method for managing cloud-based storage according to one embodiment of the invention. For example, method 500 may be performed by server 101 of FIG. 1. Referring to FIG. 5, at block 501, communications interfaces are maintained with various storage providers over a network. The storage providers may be cloud-based storage providers that provide storage services to a variety of users. At block 502, for each user, credentials for accessing user accounts in the storage providers are maintained. At block 503, a request is received from a user over a network for accessing files stored in the user accounts of the user in at least some of the storage providers. At block 504, information representing the files is retrieved from the storage providers on behalf of the user via the corresponding storage provider interfaces using the associated credentials. This operation is performed without having to prompt the user for the credentials for accessing the storage providers. At block 505, a unified logical file system view is presented to the user without exposing the actual storage locations of the files in the storage providers.

Referring back to FIGS. 2 and 4A, according to one embodiment, when a user wishes to store a file in one of the storage providers 103-105, the user can simply transmit the file to server 101. In response, storage service module 202 is configured to select one of the storage providers 103-105 and store the file in the selected storage provider based storage information 203. Thereafter, storage service module 202 updates file mapping table 204 accordingly and an updated unified file system view may be presented to the user automatically or on demand. In one embodiment, a storage provider is selected based on storage information, such as status 303 and/or user access statistics 304 of storage information 300, without user knowledge.

Figure 6:
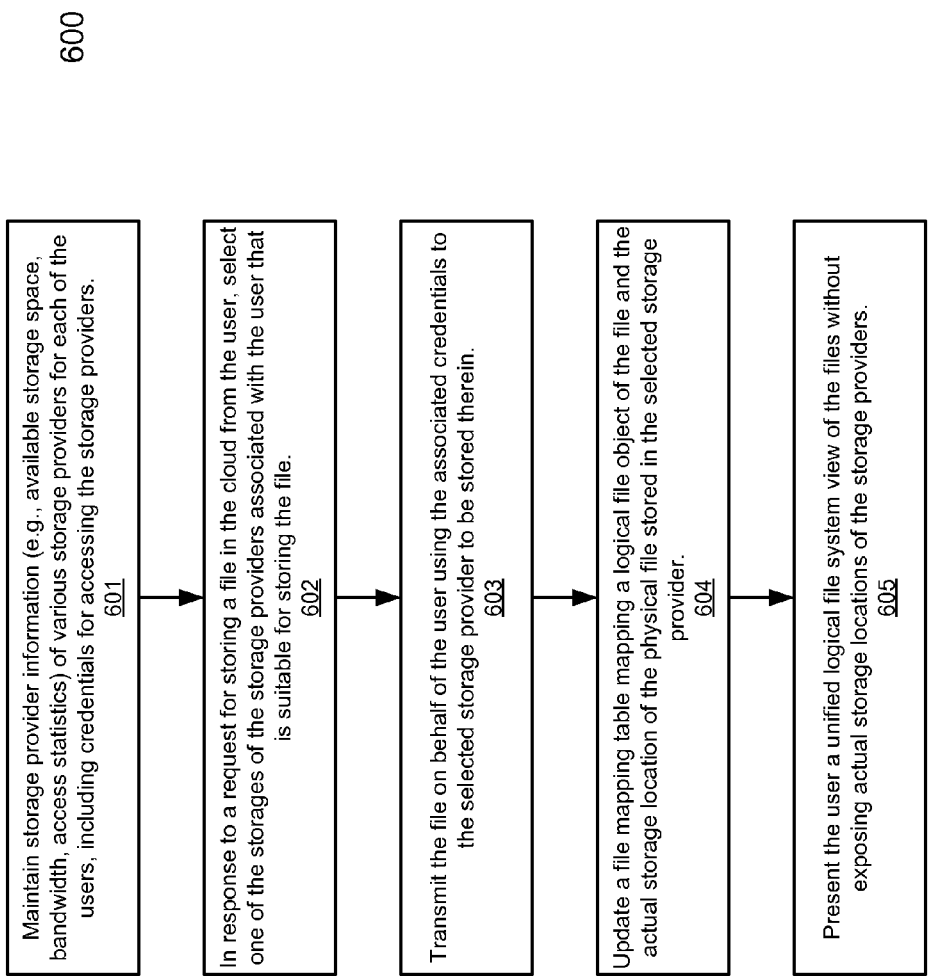
FIG. 6 is a flow diagram illustrating a method for managing cloud-based storage according to another embodiment of the invention.

FIG. 6 is a flow diagram illustrating a method for managing cloud-based storage according to another embodiment of the invention. For example, method 600 may be performed by file manager 107 of FIG. 1. Referring to FIG. 6, at block 601, storage provider information (e.g., available storage space, bandwidth, access statistics) of storage providers is maintained for each of the users, including credentials for accessing the storage providers. At block 602, in response to a request for storing a file in the cloud received from a user, one of the storage providers associated with the user is selected that is suitable for storing the file. At block 603, the file is then transmitted to the selected storage provider using the associated credentials previously cached in the management system. At block 604, a file mapping table is updated, where the file mapping table maps logical file objects presented in the unified file system view with the physical file objects stored in the storage providers. At block 605, the unified file system view is presented to the user without exposing the actual physical storage locations of the files.

Referring back to FIG. 2, in one embodiment, resource manager 201 is configured to monitor the status for each of storage providers 103-105 including available storage space, bandwidth, etc. and to store the status information in database 300. In addition, resource manager 201 further monitors the operating statistics such as access time and performance of storage providers 103-105 and store the information in database 300 as part of statistics 304. When a file is received to be stored in one of storage providers 103-105, storage service module 202 is configured to select one of storage providers 103-105 based on status information 303 and/or statistics information 304 and to store the file in the selected storage provider.

Figure 4B:
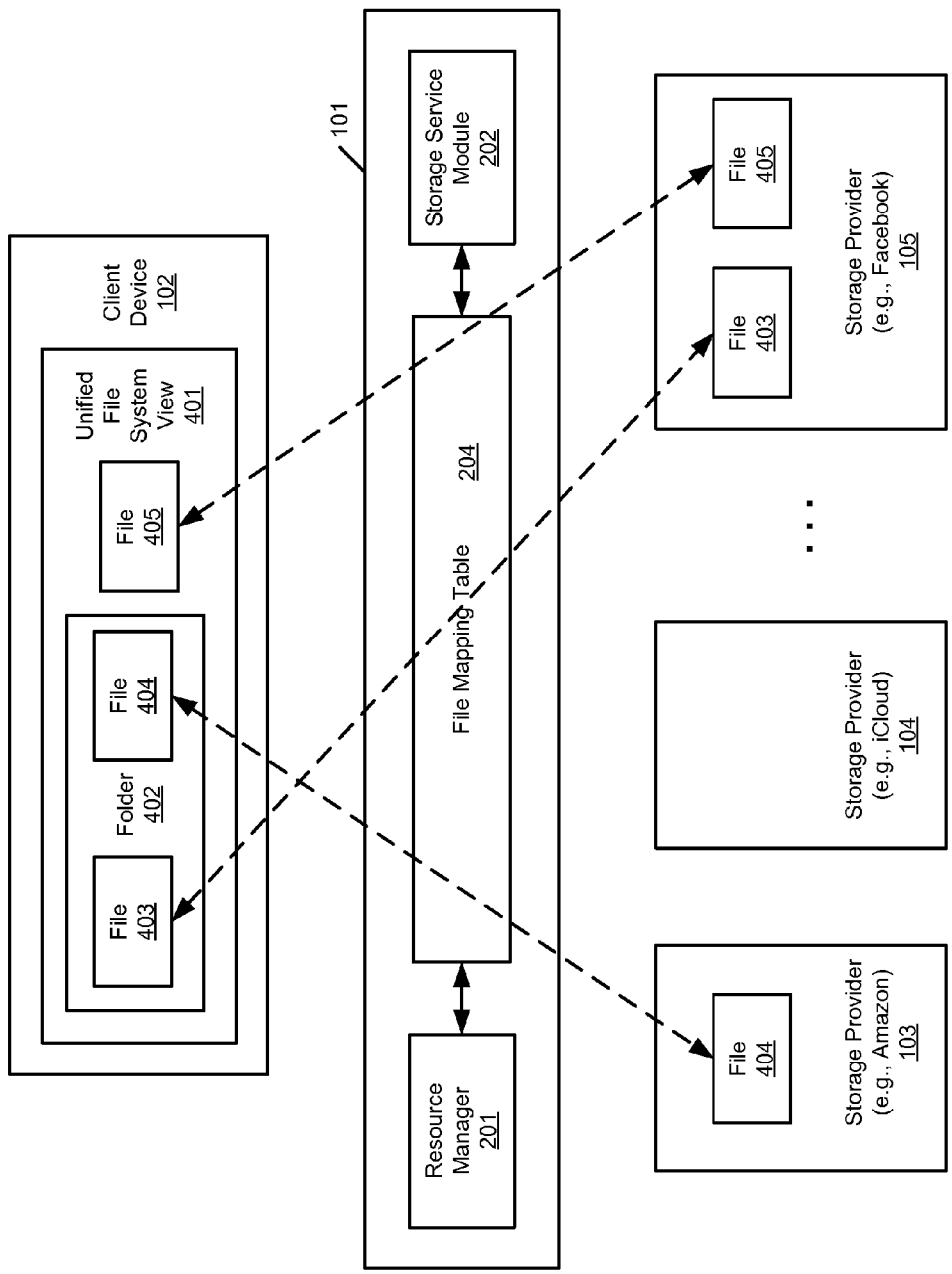

According to some embodiments, based on status information 303 and statistics information 304 of database 300 in FIG. 3, resource manager 202 may cause certain files to be migrated or relocated from one storage provider to another storage provider, as shown in FIGS. 4A and 4B. In this example, based on the storage information, file 405 has been relocated from storage provider 104 as shown in FIG. 4A to storage provider 105 as shown in FIG. 4B. However, unified file system view 401 remain the same with respect to a user; only file mapping table 204 is modified to reflect the change of storage locations of storage providers. For example, if the available space of one storage provider drops below a predetermined threshold, certain files may be migrated from that storage provider to another storage provider that has more available storage space. In another scenario, if one storage provider has a higher bandwidth or performance, certain types of files such as movie files may be migrated to that storage provider. Furthermore, similar types of files may be migrated and stored in the same storage provider. Similarly, frequently-used files may be migrated to a storage provider that has a higher performance to optimize the end user experience.

In one embodiment, when the available storage space of a user drops below a predetermined threshold, resource manager 201 may prompt the user to acquire more storage space from an existing storage provider or from a new storage provider. The storage management system may provide a mechanism or platform to enable storage providers to advertise their services or discounts to the users in exchange for profit or revenue sharing.

Figure 7:
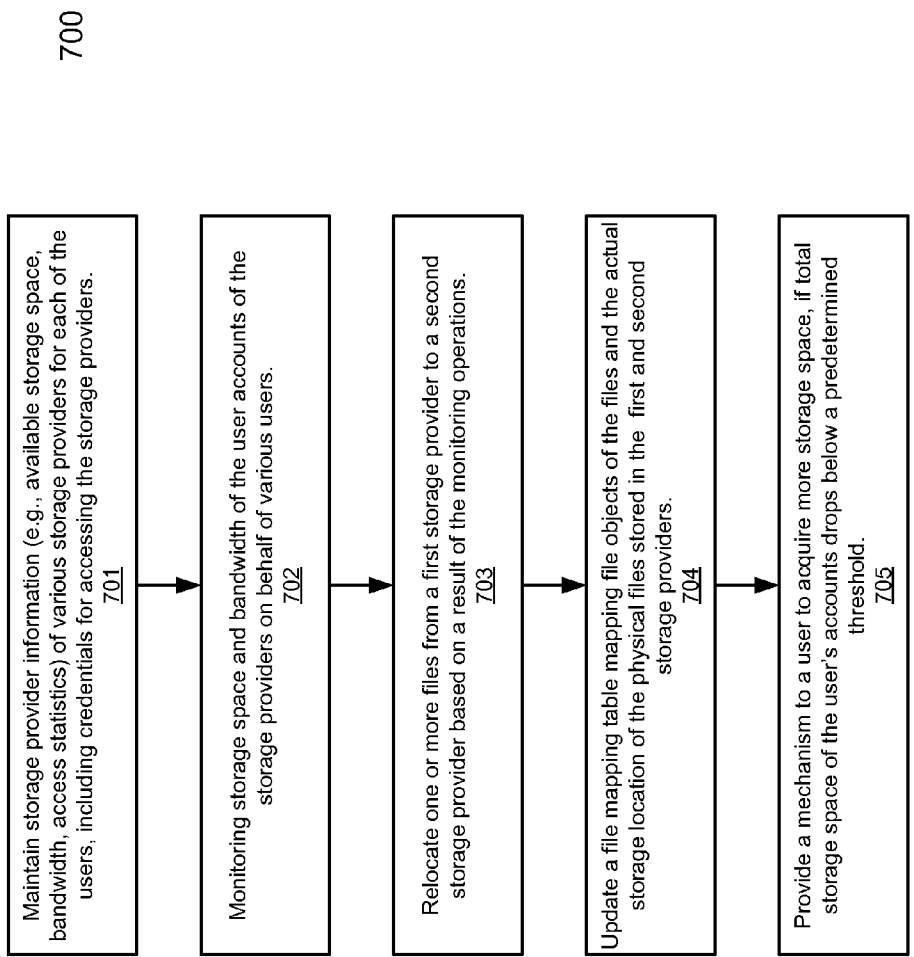
FIG. 7 is a flow diagram illustrating a method for managing cloud-based storage according to another embodiment of the invention.

FIG. 7 is a flow diagram illustrating a method for managing cloud-based storage according to another embodiment of the invention. Method 700 may be performed by file manager 107 of FIG. 1. Referring to FIG. 7, at block 701, storage provider information (e.g., available storage space, bandwidth, access statistics) of storage providers is maintained for each of the users, including credentials for accessing the storage providers. At block 702, storage status and/or statistics of user accounts of each user are monitored. At block 703, one or more files are relocated or migrated from a first storage provider to a second storage provider based on the result of the monitoring processes. At block 704, the file mapping table is updated. At block 705, a mechanism is provided to a user to acquire more storage space from an existing storage provider or a new storage provider.

Figure 8:
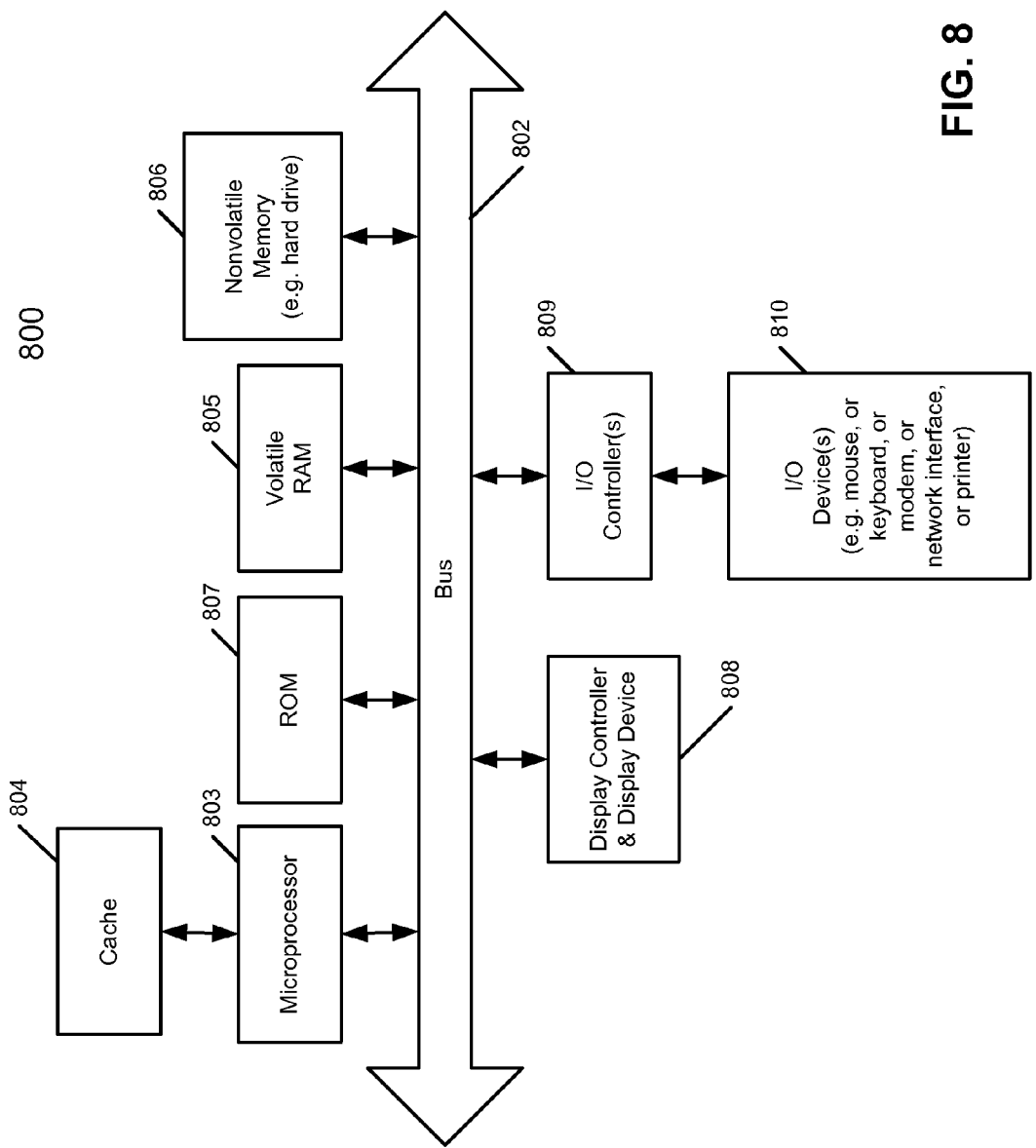
FIG. 8 is a block diagram of a data processing system, which may be used with one embodiment of the invention.

FIG. 8 is a block diagram of a data processing system, which may be used with one embodiment of the invention. For example, the system 800 may be used as a client or a server as shown in FIG. 1. Note that while FIG. 8 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention.

As shown in FIG. 8, the computer system 800, which is a form of a data processing system, includes a bus or interconnect 802 which is coupled to one or more microprocessors 803 and a ROM 807, a volatile RAM 805, and a non-volatile memory 806. The microprocessor 803 is coupled to cache memory 804. The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art.

Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 8 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals. Alternatively, I/O controller 809 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing content stored in a heterogeneous collection of storage devices, the method comprising:
   receiving, at a server over a network from a client, a request for accessing files stored in a plurality of heterogeneous storage devices hosted by a plurality of storage providers over the network, including a first storage device of a first storage provider and a second storage device of a second storage provider;
   accessing, on behalf of a user of the client, the first storage device and the second storage device to retrieve information concerning the files;
   transmitting data to the client over the network, the data representing a logical file system view of the files without exposing actual storage locations of the files stored in the first and second storage devices;
   in response to a request for storing a new file from the client, selecting, by the server computer system without notification to the client, a storage space associated with a first user account of the first storage device or a second user account of the second storage device based, at least in part, on a combination of: a remaining storage capacity of the first storage device and a remaining storage capacity of the second storage device available to the first user account and the second user account, respectively, a type of the new file, a bandwidth of the first storage provider for the first storage device and a bandwidth of the second storage provider for the second storage device, and storage provider access times associated with each of the first storage device and the second storage device when accessing files of the type of the new file;
   storing the file in the selected storage space associated with one of the first and second user accounts;
   monitoring operating statistics for the first and second storage devices comprising: monitoring at least storage provider access time and bandwidth provided by the first storage provider for the first storage device and the second storage provider for the second storage device, and client access statistics indicative of a frequency of access by the user to one or more of the files stored in the first and second storage devices; and
   migrating at least one file having the type of the new file from the first storage device to the second storage device when: the at least one file is accessed by the user more frequently than at least one other file of a different type on the first storage device, the second storage device stores one or more files of the type of the new file for the client, and the second storage device has at least one of a higher bandwidth and a shorter access time than the first storage device.

2. The method of claim 1, wherein the first storage device and the second storage device are accessed using first and second credentials that were cached within the server previously, and wherein accessing the first and second storage devices is performed without having to prompt the user for providing the first and second credentials.

3. The method of claim 1, further comprising maintaining within the server for the user a file mapping table logically mapping the logical file system view with physical files stored in the first and second storage devices.

4. The method of claim 3, further comprising:
updating the file mapping table within the server based on the storage of the file in the selected storage space.

5. The method of claim 1, wherein providing the mechanism to acquire more storage space comprises arranging the third storage provider for the user to acquire more storage space from a third storage device.

6. The method of claim 3, further comprising:
updating the file mapping table within the server in response to migrating one or more files from the first storage device to the second storage device based at least in part on the monitored operating statistics and the monitored accesses statistics.

7. A computer-readable storage medium having instructions stored therein, which when executed by a computer, cause the computer to perform a method for managing content stored in heterogeneous storage devices, the method comprising:
receiving, at a server over a network from a client, a request for accessing files stored in a plurality of heterogeneous storage devices hosted by a plurality of storage providers over the network, including a first storage device of a first storage provider and a second storage device of a second storage provider;
accessing, on behalf of a user of the client, the first storage device and the second storage device to retrieve information concerning the files;
transmitting data to the client over the network, the data representing a logical file system view of the files without exposing actual storage locations of the files stored in the first and second storage devices;
in response to a request for storing a new file from the client, selecting, by the server computer system without notification to the client, a storage space associated with a first user account of the first storage device or a second user account of the second storage device based, at least in part, on a combination of: a remaining storage capacity of the first storage device and a remaining storage capacity of the second storage device available to the first user account and the second user account, respectively, a type of the new file, a bandwidth of the first storage provider for the first storage device and a bandwidth of the second storage provider for the second storage device, and storage provider access times associated with each of the first storage device and the second storage device when accessing files of to the type of the new file;
storing the file in the selected storage space associated with one of the first and second user accounts;
monitoring operating statistics for the first and second storage devices comprising: monitoring at least storage provider access time and bandwidth provided by the first storage provider for the first storage device and the second storage provider for the second storage device, and client access statistics indicative of a frequency of access by the user to one or more of the files stored in the first and second storage devices; and
migrating at least one file having the type of the new file from the first storage device to the second storage device when: the at least one file is accessed by the user more frequently than at least one other file of a different type on the first storage device, the second storage device stores one or more files of the type of the new file for the client, and the second storage device has at least one of a higher bandwidth and a shorter access time than the first storage device.

8. The computer-readable storage medium of claim 7, wherein the first storage device and the second storage device are accessed using first and second credentials that were cached within the server previously, and wherein accessing the first and second storage devices is performed without having to prompt the user for providing the first and second credentials.

9. The computer-readable storage medium of claim 7, wherein the method further comprises maintaining within the server for the user a file mapping table logically mapping the logical file system view with physical files stored in the first and second storage devices.

10. The computer-readable storage medium of claim 9, wherein the method further comprises:
updating the file mapping table within the server based on the storage of the file in the selected storage space.

11. The computer-readable storage medium of claim 7, wherein providing the mechanism to acquire more storage space comprises arranging the third storage provider for the user to acquire more storage space from a third storage device.

12. The computer-readable storage medium of claim 9, wherein the method further comprises:
updating the file mapping table within the server in response to migrating one or more files from the first storage device to the second storage device based at least in part on the monitored operating statistics and the monitored accesses statistics.

13. A data processing system, comprising:
an application programming interface (API) to receive a request from a client for accessing files stored in a plurality of heterogeneous storage devices hosted by a plurality of storage providers over the network, including a first storage device of a first storage provider and a second storage device of a second storage provider; and
a storage service module to
access, on behalf of a user of the client, the first storage device and the second storage device to retrieve information concerning the files,
transmit data to the client over the network, the data representing a logical file system view of the files without exposing actual storage locations of the files stored in the first and second storage devices,
select, in response to a request for storing a new file from the client without notification to the client, a storage space associated with a first user account of the first storage device or a second user account of the second storage device based, at least in part, on a combination of: a remaining storage capacity of the first storage device and a remaining storage capacity of the second storage device available to the first user account and the second user account, respectively, a type of the new file, a bandwidth of the first storage provider for the first storage device and a bandwidth of the second storage provider for the second storage device, and storage provider access times associated with each of the first storage device and the second storage device when accessing files of the type of the new file,
store the file in the selected storage space associated with one of the first and second user accounts,
monitor operating statistics for the first and second storage devices comprising: monitoring at least storage provider access time and bandwidth provided by the first storage provider for the first storage device and the second storage provider for the second storage device, and client access statistics indicative of a frequency of access by the user to one or more of the files stored in the first and second storage devices, and migrate at least one file having the type of the new file from the first storage device to the second storage device when: the at least one file is accessed by the user more frequently than at least one other file of a different type on the first storage device, the second storage device stores one or more files of the type of the new file for the client, and the second storage device has at least one of a higher bandwidth and a shorter access time than the first storage device.

14. The system of claim 13, further comprising a database to store first and second credentials associated with the first storage device and second storage device, respectively, wherein accessing the first and second storage devices is performed using the first and second credentials without having to prompt the user for providing the first and second credentials.

15. The system of claim 13, further comprising a file mapping table for the user logically mapping the logical file system view with physical files stored in the first and second storage devices.

16. The system of claim 15, wherein the storage service module is configured to:
update the file mapping table within the server based on the storage of the file in the selected storage space.

17. The system of claim 13, wherein the resource manager is configured to arrange the third storage provider for the user to acquire more storage space from a third storage device.

18. The system of claim 15, further comprising a resource manager configured to:
update the file mapping table within the server in response to migrating one or more files from the first storage device to the second storage device based at least in part on the monitored operating statistics and the monitored accesses statistics.

19. A computer-implemented method for managing content stored in a heterogeneous collection of storage devices, the method comprising:
receiving, at a server, a request for storing a file from a client over a network;
determining, by the server computer system without notification to the client, whether a first storage device of a first storage provider is suitable to store the file based, at least in part, on a combination of: a remaining storage capacity of the first storage device available to a first user account of the client associated with the first storage provider, a type of the new file, a bandwidth of the first storage provider for the first storage device, and storage provider access times associated with each of the first storage device and when accessing files of the type of the new file;
when the first storage device is determined to be suitable to store the file, storing the file in a first storage space of the first storage device;
when the first storage device is determined not to be suitable to store the file, obtaining a storage space of a second storage device from a second storage provider over the network, and storing the file in the second storage device hosted by the second storage provider;
monitoring operating statistics for the first and second storage devices comprising: monitoring at least storage provider access time and bandwidth provided by the first storage provider for the first storage device and the second storage provider for the second storage device, and client access statistics indicative of a frequency of access by the user to one or more of the files stored in the first and second storage devices; and
migrating at least one file having the type of the new file from the first storage device to the second storage device when: the at least one file is accessed by the user more frequently than at least one other file of a different type on the first storage device, the second storage device stores one or more files of the type of the new file for the client, and the second storage device has at least one of a higher bandwidth and a shorter access time than the first storage device.

20. The method of claim 19, further comprising transmitting to the client information representing the second storage provider to enable a user of the client to acquire the storage space, if the first storage device is not suitable to store the file.

21. The method of claim 19, further comprising maintaining within the server for the user a file mapping table logically mapping a logical file system view with physical files stored in the first and second storage devices.

22. The method of claim 1, further comprising:
in response to storing the file in the selected storage space, determining that an available amount of storage at the selected storage space of at least one of the first and second user accounts is below a threshold; and
providing a mechanism to the user to acquire more storage space from a third storage provider, wherein the third storage provider advertises storage services to the user via the mechanism, and wherein at least one of revenue resulting from the user engaging the third storage provider or revenue resulting from providing an advertisement of the third storage provider to the user is shared with a storage management service provided by the server.

* * * * *